RE 25162
Jan. 27, 1959     L. M. FORSTER     2,870,605
AUTOMOTIVE VEHICLE POWER BRAKE EMPLOYING
POWER STEERING PUMP PRESSURE
Filed April 16, 1956
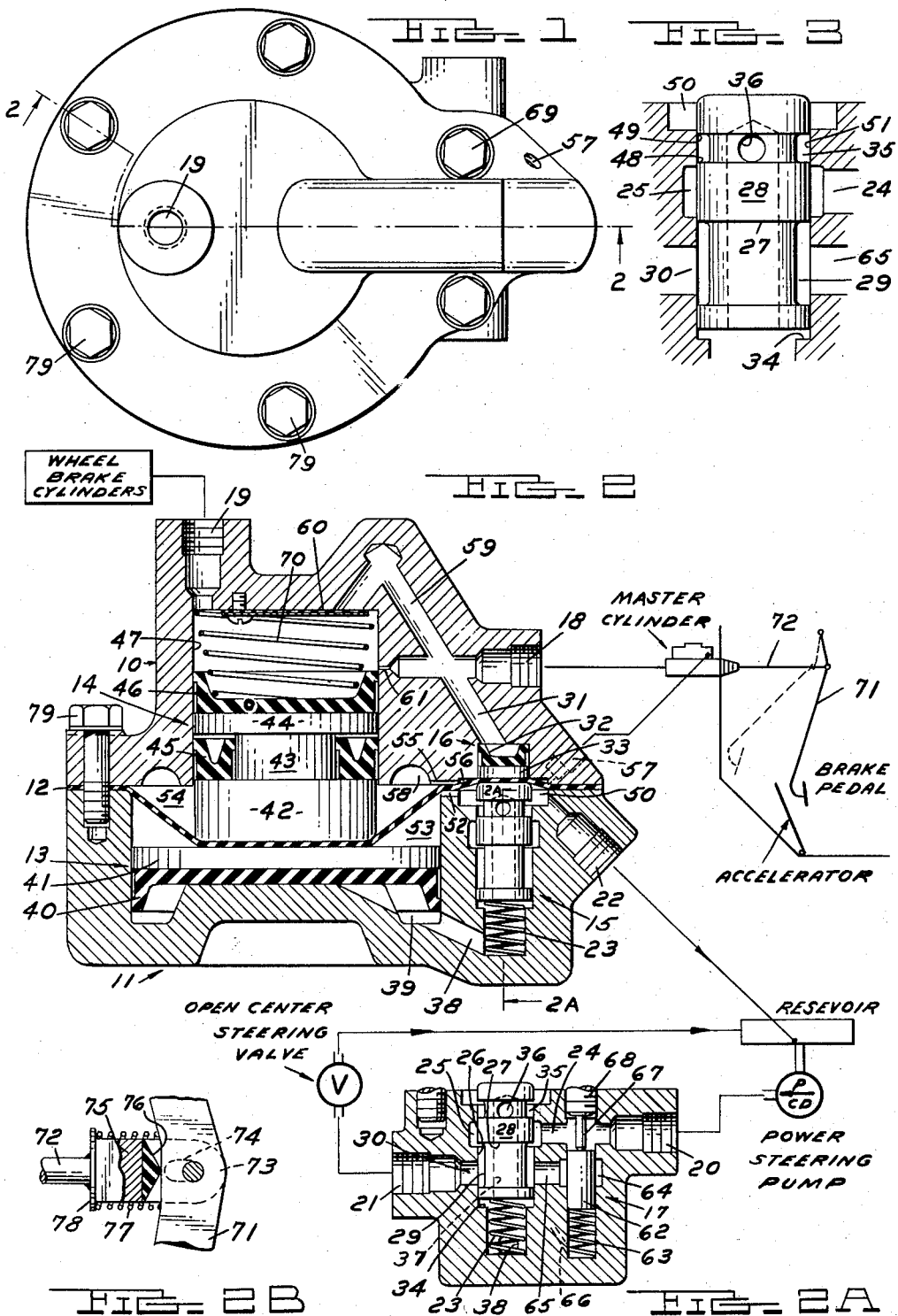

United States Patent Office 2,870,605
Patented Jan. 27, 1959

2,870,605

AUTOMOTIVE VEHICLE POWER BRAKE EMPLOYING POWER STEERING PUMP PRESSURE

Lloyd M. Forster, Birmingham, Mich.

Application April 16, 1956, Serial No. 578,279

16 Claims. (Cl. 60—54.5)

This invention relates to an automotive vehicle power brake system using power steering pump pressure.

The operating characteristics of conventional open center power steering systems are such as to provide a source of maximum hydraulic pressure in the order of 750 to 1000 p. s. i. of which approximately 500 p. s. i. may be used for sustained periods of time corresponding to prolonged braking applications without danger of overheating through pumping against high pressure. Maximum hydraulic brake line pressure required under the most severe braking conditions in present passenger cars may be in the order of 1200 to 1600 p. s. i. depending on brake design. Accordingly, intensification of available steering pump pressure in the order of 2½ to 3 times will provide a pressure supply adequate to meet all braking requirements without reliance on foot generated pressure to supplement power application. In comparison with vacuum power booster equipment involving a pressure source in the order of 10 p. s. i. steering pump pressure offers the potential opportunity to provide power brake mechanism of greatly reduced size and cost.

However, in order to provide a combined power steering and brake system free of commercially objectionable characteristics, a number of problems and requirements must be met. There should be no discernible interference or interaction between power steering and braking operations; where, as is presently the practice, different steering and brake hydraulic fluids are employed, provision must be made to prevent mixing by positively sealing the respective hydraulic circuits from each other while permitting interaction of fluid pressures; provision should be made for adequate non-power brake application in the absence of power steering pump pressure, as when the engine dies; and, in order to realize the maximum savings in equipment and costs, conventional hydraulic brake and power steering circuits should be utilized with as little change as possible consistent with full realization of the desirable features of conventional independent power brake and power steering systems.

The present invention meets these objectives, requirements and problems through a system which fully retains the conventional non-power hydraulic brake system (subject to any desired modification of pedal position) as well as the conventional open center power steering system and simply interposes a small compact power brake control unit in the existing power steering and hydraulic brake circuits. An unstressed flexible diaphragm provides a positive seal against mixture of different steering and brake fluids. Master cylinder pressure arising from foot pedal application is normally employed solely as a control pressure to actuate a power brake control valve which for an imperceptible fraction of a second diverts flow from the power steering circuit to fill the wheel brake cylinders, establishes a steering pump output pressure adequate for maximum brake requirements and then modulates such pressure to a desired multiple of control pressure while permitting full normal distribution of pump discharge and pressure to the power steering circuit. Provision is made for master cylinder pressure to directly actuate wheel brake cylinders in the absence of power steering pump pressure, while power brake applications involving any desired predetermined multiple of driver foot pressure are effected without any loss of pedal height due to brake wear.

Accordingly, the principal object of the present invention is to provide a power brake system fully utilizing existing components of conventional power steering and non-power hydraulic brake systems with a minimum of additional equipment.

Another object is to retain normal operating characteristics of the conventional power steering system without any perceptible interference or interaction between power brake and steering applications.

Another object is to provide for driver energized brake application in the absence of power steering pump pressure.

Another object is to provide means for positively sealing the steering and brake circuits from each other when different fluids are used.

Another object is to use a flexible diaphragm to effect such sealing, permit interaction of fluid pressures between the two systems, and avoid pressure stress of unsupported areas of such diaphragm.

Another object is to provide a constant level power brake pedal having a normal control position which does not go down with brake wear but which does go down in the absence of power to indicate need for brake adjustment.

Another object is to employ such constant pedal level characteristic to provide a "low" pedal suspension relative to accelerator position while retaining "high" pedal mechanical advantage characteristics for power off applications thereby avoiding the necessity for a reserve pressure accumulator characteristic of conventional "low" pedal power brake installations.

Another object is to provide for rapid power filling of brake cylinders without requirement for displacement of brake pedal other than for a very small travel incident to actuating the control valve.

Another object is to provide a yielding soft pedal feel particularly desirable for smooth light brake requirements such as encountered in parking maneuvers.

Another object is to provide a geometrically progressive increasing resistance to pedal yield with increasing foot pressure to avoid undesirable pedal travel for high pressure brake applications.

Another object is to provide an initial preload resistance to pedal yield to minimize pedal travel required to initiate brake action.

These and other objects will be more apparent from the following detailed description of a preferred embodiment of my invention and from an examination of the drawings illustrating such embodiment, wherein Fig. 1 is a plan view of the present power brake assembly;

Fig. 2 is a sectional elevation taken along the line 2—2 of Fig. 1 including a schematic illustration of the interposition of such assembly in typical automotive vehicle brake and power steering circuits.

Fig. 2a is a sectional elevation of the main brake control valve and by-pass valve taken along the line 2a—2a of Fig. 2 rotated 90 degrees into the plane of Fig. 2 for convenience in illustrating connections to the power steering circuit.

Fig. 2b is an enlarged fragmentary view of a preferred form of resilient pivotal connection between the brake pedal lever arm and the master cylinder actuating rod schematically illustrated in Fig. 2;

Fig. 3 is an enlarged view of the main brake control valve shown in Figs. 2 and 2a shifted to an intermediate brake modulating position.

Referring to Figs. 2 and 2a, it will be seen that the principal components of the present power brake mechanism include an upper housing casting 10, a lower housing casting 11, a flexible diaphragm fluid separator 12 therebetween, a lower intensifier piston assembly 13, an upper intensifier piston assembly 14, a main brake control valve 15, a valve actuator 16, and a by-pass valve 17. The assembly is interposed in hydraulic brake and power steering circuits of an automotive vehicle as illustrated, the upper housing communicating through port 18 with a line conducting hydraulic brake fluid from a brake pedal actuated master cylinder and through port 19 with a line conducting hydraulic brake fluid to the wheel cylinders, the lower housing communicating through port 20 with a line conducting hydraulic steering oil from a power steering pump, through port 21 with a line conducting steering oil to a conventional open center steering valve, and through port 22 with a line conducting exhaust steering oil to the power steering pump reservoir.

In the absence of any brake requirement, valve 15 is held in the position shown by a light return spring 23 and steering oil passes unrestricted through port 20, passage 24, around the undercut annulus 25 in valve bore 26, past the opening edge 27 of the valve land 28, around the necked portion 29 of the valve, through passage 30 and port 21 to the steering valve. Upon application of the brake pedal, master cylinder pressure communicating with port 18 and passage 31 moves the valve actuator 16, consisting of lip seal 32 and piston disc 33, registering through diaphragm 12 with the end of valve 15, depressing the valve to the limit of its travel established by shoulder stop 34 in which position flow from annulus 25 past the land edge 27 is blocked but passes freely around the valve groove 35, through cross holes 36, the axial valve passage 37, spring chamber, and passage 38 to the annular cylinder chamber 39 thereby actuating intensifier piston 13, consisting of lip seal 40 and piston disc 41 registering through diaphragm 12 with the upper intensifier piston assembly 14 consisting of plunger 42, spacer section 43, piston disk 44, U-lip seal 45 and lip seal 46 operating in the cylinder bore 47, the displacement of which piston assembly delivers hydraulic brake fluid through port 19 to the wheel brake cylinders.

Upon filling of the brake cylinders, resistance to further flow of pump discharge through valve 15 causes a pressure actuation of piston assembly 13 and piston 14 establishing a wheel brake cylinder pressure multiplied by the ratio of areas of the respective pistons 13 and 14. When the pressure actuating piston 13 builds up to a value balancing the valve actuating pressure from the master cylinder, the valve 15 will move up to a brake modulating position as shown in Fig. 3 in which position, it will be noted, flow from annulus 25 across the land edge 27 continues to be blocked thereby causing a further build up of pump pressure, beyond that required for the immediate brake application as admitted to actuate piston 13, to a by-pass pressure in the order of 500 p. s. i. established in the passage 24 whereupon by-pass valve 17 opens to admit full flow from the power steering pump through passage 65 across the necked portion 29 of valve 15 and passage 30, port 21 and the power steering valve. Thus, as long as the brakes remain applied, a source pressure in the order of 500 p. s. i. is maintained in the annulus 25 while effective brake modulation is obtained by the relative effective orifice restriction of the annular clearance 48 between groove 35 and presurized annulus 25 on the one hand and the annular clearance 49 between groove 35 and the exhaust chamber 50 on the other hand, the land 51 in the valve bore being sufficiently wider than the groove 35 to minimize flow from the pressurized annulus 25 to the exhaust chamber 50 through the annular clearance orifices 48 and 49. Only a very small flow is required to provide prompt response in adjustment of brake value once the lost motion in the wheel brake cylinders has been taken up and the brakes are set. In practice, it has been found that in using a one-half inch diameter spool valve with a close free sliding fit in the valve bore, a width of land 51 approximately .035 of an inch greater than that of groove 35 provides highly satisfactory brake modulation while a width of land 28 .035 greater than annulus 25 will assure maintenance of the full 500 p. s. i. supply pressure in passage 24 throughout all brake modulation values while minimizing the necessary total travel of the valve between open brake exhaust and open brake apply positions. In this connection the open exhaust position of the valve 15 as shown in Figs. 2 and 2a preferably provides annular openings sufficient for unrestricted flow to the steering valve and for rapid release of the brake apply pressure to the exhaust chamber 50, while the open apply position with the valve spool bottomed on shoulder 34 is preferably sufficient to provide unrestricted flow from annulus 25 to the cross holes 36. It has been found in practice that a total travel of the valve spool of less than 1/16 of an inch (in the case of a one-half inch diameter spool) is entirely adequate to meet all of these requirements.

In the event of a power steering requirement exceeding 500 p. s. i. a correspondingly higher brake supply pressure will be established in the pasasge 24 and annulus 25 which may call for a minute adjustment in the actual position of the control valve to correct the relative effective values of the orifices 48 and 49 in order to maintain a given brake value under increased supply pressure. However, such adjustment is completely automatic and without any perceptible feel whatsoever in the brake pedal, while any change in the value of required steering pressure below the by-pass pressure will not affect the established brake supply pressure in passage 24 and accordingly will have no effect on the brake valve or brake apply pressures. On the other hand, if the brakes are initially applied during the progress of a power steering application, flow to the steering circuit will be interrupted for a small fraction of a second while the brake cylinders are filling after which full flow to the steering circuit will resume, and in practice the duration of the interruption has been found to be so small as to be entirely imperceptible under all normal steering operations involving any combination or relative timing of braking and steering applications.

The feature of establishing and maintaining a relatively high brake supply pressure throughout the duration of the brake application has been found to be an important factor in eliminating interference or interaction feel between the power brake and power steering systems, inasmuch as all prior attempts during the development of the present control to provide a brake control valve which would block flow from the power steering pump only sufficiently to establish the immediately required brake pressure were accompanied by undesirable interaction feel when a power steering application was made during the progress of a brake application.

Exhaust chamber 50 communicating with exhaust port 22 also communicates through passage 52 with the cylinder chamber 53 under the diaphragm 12 while the corresponding portion of the chamber 54 above the diaphragm 12 communicates through passage 55 to the exhaust chamber 56 communicating through port 57 with a line leading to the master cylinder reservoir. An annular recess 58 is provided in the upper body casting 10 and the diaphragm is preferably preformed to fit such recess in its natural condition whereby surplus material is provided within the diaphragm to permit its movement throughout the stroke of piston assembly 13 and 14 with little or no stretching. This together with the equal exhaust pressures on either unsupported side of the diaphragm eliminates the possibility of diaphragm failure through over-stressing and assures the maintenance of continued positive seal between the dissimilar brake fluid and power steering oil. A synthetic rubber diaphragm sold under the trade name "Fairprene" has been found in practice to be compatible with both conventional brake fluid and steering oil. However, as an alternative a double ply diaphragm may be employed, each chosen for its compatible characteristics with the fluid adjacent its surface.

In the absence of power from the steering pump, master cylinder pressure will pass from port 18 through passage 59 and flapper valve 60 into the cylinder chamber 47 and directly through port 19 to the wheel brake cylinders as in the case of conventional non-power hydraulic brakes, the piston assemblies 13 and 14 being normally held in the return position shown by spring 70 and being stationary during such manual brake application. Release of manually applied brake pressure is effected through the pressure equalizing bleed hole 61 which in the case of power application is sealed off by the initial movement of lip seal 46. The U-seal 45 is provided to prevent leakage of master cylinder pressure through the hole 61 to exhaust during power applications.

It will be understood that the valve actuator 16 consisting of lip seal 32 and piston disk 33 may be provided with a differential area relative to the diameter of the valve 15 as shown in order to provide a desired over-all multiplication ratio between master cylinder pressure and wheel brake cylinder pressure. Thus, if it is desired to limit the by-pass pressure to a given value (such as 500 p. s. i.) less than the maximum pressure capacity of the steering pump in order to avoid overheating during any prolonged brake application while providing a maximum wheel brake cylinder pressure, such as 1500 p. s. i., a three-to-one ratio of areas between piston assembly 15 and 14, such as shown, may be provided. If on the other hand it is desired to limit the total multiplication between master cylinder and wheel brake cylinder pressure to a value such as two-to-one, a somewhat smaller valve actuator 16 is called for to convert the intensifier pressure multiplication to a desired over-all ratio.

Referring to certain constructional features not previously described, it will be seen with reference to Fig. 2a that the by-pass valve consists of a simple cylindrical plunger 62 urged by spring 63 to close communication of the annulus 64 and passage 65 from direct communication with the inlet port 20, any leakage past the piston 62 being vented through exhaust passage 66 communicating with the exhaust chamber 50. The piston 62 is normally seated against the stop pin 67 formed as an extension of the threaded end 68 of one of the bolts 69 employed in assembling the upper and lower housing together.

It will be understood from the description thus far that in normal power brake applications the only displacement of master cylinder fluid is that involved in actuating the control valve 15 which, in the absence of supplemental resilient linkage, provides a substantially solid feel to the brake pedal and a control of brake pressure substantially responsive to pedal pressure alone rather than a combination of pressure and pedal movement as in the case of conventional non-power brakes or power brakes of the vacuum booster type. While such a pressure control is highly effective and convenient since it involves a minimum of foot travel, some change in habit is involved in becoming accustomed to it particularly in effecting relatively light brake application such as involved in parking maneuvers. In addition, there is a considerable weight of opinion among brake authorities that some pedal movement as well as pressure response is desirable for maximum controllability particularly in the critical range of light brake applications where over control is readily possible. In order to provide for pedal travel and a resilient soft feel for such light applications, a resilient element in the brake linkage has been provided. As shown in Fig. 2b between the brake lever 71 and master cylinder actuating rod 72, a pair of side bar elements 73 rigidly connected to the rod 72 are provided with slotted pin apertures to accommodate relative motion between the brake lever 71 and rod 72. A solid spacer element 75 rigidly connected to the side bars 73 provides a seat for a tapered rubber compression element 76 vulcanized or otherwise suitably secured to the spacer 75. A preloaded compression spring 77 reacting between the brake lever 71 and a washer 78 secured to the rod 72 is preferably provided with a value such as to resist compression of the rubber element 76 until a master cylinder actuating pressure just short of initial brake apply point is reached in order to minimize lost motion of the brake pedal in effecting initial brake application as well as to preserve the more yieldable pointed portion of the compression element to provide a high degree of softness of feel for light brake pressure application. As brake pedal pressure is increased, a progressively increasing area of the rubber element is effective to resist compression and a geometrically progressive increase of resistance of pedal movement with increasing pedal pressure is thereby effected. This results in a desirably increasing firmness of pedal for the higher pressure brake applications without incurring any sudden bottoming position.

It will be understood that since the present control provides power steering with no displacement of master cylinder fluid other than to actuate the control valve a constant level of power brake application will prevail regardless of the degree of lost motion in the wheel brake cylinders. This characteristic makes it possible to design the brake pedal suspension as illustrated with the power brake pedal apply position close to the level of the accelerator, as in the case of conventional low pedal power brakes, while retaining a total stroke for non-power application of an order comparable to that employed in conventional non-power hydraulic brake systems, thus providing an adequate mechanical advantage for non-power applications consistent with safety and without resort to a reserve pressure supply or accumulator system. While such arrangement would lead to an inconvenient pedal operating level with increasing brake wear which would render it undesirable for normal power brake systems wherein the pedal actuating position goes down with brake wear, such inconvenience in the present system will be only occasionally encountered in the case of power failure and is therefore a feasible solution to the power-off safety problem.

Air bleed holes have been omitted in the drawing. However, it will be noted that if the power brake unit is positioned in the vehicle with the valve end of the assembly in lowermost position, suitable bleed holes may be provided on the upper side of the assembly in accordance with conventional practice which will effectively permit evacuation of all air from the assembly.

In initially assembling the housing elements with the interposed diaphragm, it may be convenient to connect vacuum lines to the ports 18 and 19 to hold the elements of the piston assembly 14 in a raised position while the bolts 79 are passed through the diaphragm holes and turned down into clamping position. Upon release of the vacuum, spring 70 will then move the piston assembly into engagement with the lower piston as shown. It will be noted that all of the piston elements are under compression throughout all phases of operation either with or without power. Accordingly, the elements 42, 43 and 44 may be separate pieces without positive connection. It will also be noted that the compression of these elements in operation provides the effect of an integral solid differential piston unit with respect to resisting any cocking action of individual short elements in the cylinder bore while at the same time permitting moderate misalignment of the respective large and small bores in accordance with commercial tolerances.

From the above description of a preferred embodiment of the present power brake mechanism, it will be understood that a small compact and relatively inexpensive unit has been provided which meets the various objects set forth above. While such embodiment has been shown and described in detail, it will be further understood that numerous modifications might be resorted to without departing from the scope of the invention as defined in the following claims.

I claim:

1. In an automotive vehicle equipped with a power steering system including hydraulic pump and open center steering valve elements and a hydraulic brake system including master cylinder and wheel cylinder elements; a power brake mechanism interposed in said steering system between said pump and steering valve elements and interposed in said brake system between said master cylinder and wheel cylinder elements, said mechanism including means employing steering pump pressure to actuate said wheel brake cylinders, means for providing substantially unrestricted flow between said pump and steering valve elements in the absence of master cylinder pressure brake demand, means for diverting pump flow to actuate said wheel cylinder elements in response to master cylinder pressure brake demand, means for shutting off said pump flow to actuate said wheel cylinder elements in response to the establishment of wheel cylinder pressure proportional to master cylinder control pressure, means for establishing a back pressure to pump flow exceeding pressure requirements for normal braking during any period of brake application, means for passing full pump flow to said steering valve element while maintaining said back pressure, means for modulating said back pressure to adjust wheel cylinder pressure in accordance with variations in master cylinder pressure, and means for exhausting fluid pressure for actuating said wheel cylinders in response to release of master cylinder pressure and for re-establishing said unrestricted flow between said pump and steering valve elements.

2. In an automotive vehicle equipped with a power steering system including hydraulic pump and open center steering valve elements and a hydraulic brake system including master cylinder and wheel cylinder elements; a power brake mecahnism interposed in said steering system between said pump and steering valve elements and interposed in said brake system between said master cylinder and wheel cylinder elements, said mechanism including means employing steering pump pressure to actuate said wheel brake cylinders, control means responsive to master cylinder pressure for directing steering pump pressure to actuate said wheel brake cylinders and for regulating the intensity of said application as a function of the intensity of master cylinder pressure, and means for positively sealing the hydraulic power steering fluid employed in said power steering system from the brake fluid employed in said hydraulic brake system.

3. A power brake mechanism as set forth in claim 2 wherein said last means comprises flexible diaphragm means separating brake fluid from hydraulic steering fluid in said mechanism.

4. A power brake mechanism as set forth in claim 2 wherein said last means comprises flexible diaphragm means interposed between all elements of said mechanism which are contacted by brake fluid and all elements of said mechanism which are contacted by hydraulic steering fluid, housing means being provided to clamp said diaphragm means with unsupported flexible areas free to move with said actuating and control elements, and means being provided to equalize the pressure on either side of said diaphragm means in unsupported flexing areas in order to substantially avoid any diaphragm stress arising from differential fluid pressures.

5. In an automotive vehicle equipped with a power steering system including hydraulic pump and open center steering valve elements and a hydraulic brake system including master cylinder and wheel cylinder elements, said hydraulic pump being capable of operating upon demand at a predetermined high pressure level for a period corresponding to maximum sustained braking requirements without over heating or other damage, said hydraulic brake system being designed to operate with a predetermined maximum wheel cylinder pressure for maximum braking requirements, said maximum wheel cylinder pressure being substantially in excess of said predetermined pump pressure; power brake mechanism interposed in said steering system between said pump and steering valve elements and interposed in said brake system between said master cylinder and wheel cylinder elements, said mechanism including differential area piston means employing steering pump pressure to actuate said wheel cylinders, the ratio of areas of said differential piston means corresponding to the ratio of said predetermined pump pressure and said maximum wheel cylinder pressure to provide for a corresponding intensification of pump pressure, means for providing substantially unrestricted flow between said pump and steering valve elements in the absence of master cylinder pressure brake demand, means for diverting pump flow to actuate said differential piston means and said wheel cylinder elements in response to master cylinder pressure brake demand, means for shutting off said pump flow to actuate said differential piston means in response to the establishment of wheel cylinder pressure proportional to said master cylinder pressure, means for establishing a back pressure to pump flow substantially equal to said predetermined high pump pressure during periods of brake application, means for passing full pump flow to said steering valve element while maintaining said back pressure, and means for modulating said back pressure to adjust wheel cylinder pressure in accordance with variations in master cylinder pressure.

6. Power brake mechanism as set forth in claim 5 including diaphragm means interposed between differential area elements of said differential piston means to provide for positive separation of hydraulic pump fluid and hydraulic brake fluid.

7. In an automotive vehicle equipped with a power steering system including hydraulic pump and open center steering valve elements and a hydraulic brake system including master cylinder and wheel cylinder elements; a power brake mechanism interposed in said steering system between said pump and steering valve elements and interposed in said brake system between said master cylinder and wheel cylinder elements, said mechanism including means employing steering pump pressure to actuate said wheel brake cylinders, control means responsive to master cylinder pressure for directing and regulating the intensity of said actuation, means for admitting flow of master cylinder pressure to and from said wheel cylinder elements as required for conventional manual hydraulic brake application and modulation in the absence of hydraulic pump pressure, and means for blocking the flow of master cylinder pressure to said wheel cylinder elements during power brake applications.

8. In an automotive vehicle equipped with a power steering system including hydraulic pump and open center steering valve elements and a hydraulic brake system including brake pedal, master cylinder and wheel cylinder elements, a power brake mechanism interposed in said steering system between said pump and steering valve elements and interposed in said brake system between said master cylinder and wheel cylinder elements, said mechanism including means employing steering pump pressure to actuate said wheel cylinder elements, control valve means for directing and regulating the intensity of said actuation in response to master cylinder pressure developed by displacement of said brake pedal, and means for limiting the displacement of fluid in said master cylinder during power brake applications to that required to displace said control valve means.

9. In an automotive vehicle equipped with a power steering system including hydraulic pump and open center steering valve elements and a hydraulic brake system including brake pedal, master cylinder and wheel cylinder elements, a power brake mechanism interposed in said steering system between said pump and steering valve elements and interposed in said brake system between said master cylinder and wheel cylinder elements, said mechanism including means employing steering pump pressure to actuate said wheel cylinder elements, control valve means for directing and regulating the intensity of said actuation in response to master cylinder pressure developed by displacement of said brake pedal, and means for establishing a constant operating range of brake pedal travel for power brake actuation regardless of varying displacement of said wheel cylinder elements.

10. Power brake mechanism as set forth in claim 9 including resilient means to provide a limited degree of pedal travel with increasing brake application pedal pressure.

11. Power brake mechanism as set forth in claim 9 including resilient means to provide a limited degree of pedal travel with increasing brake application pedal pressure, said resilient means providing a geometrically progressively increasing resistance to pedal movement with increasing pedal pressure.

12. Power brake mechanism as set forth in claim 9 including resilient means to provide a limited degree of pedal travel with increasing brake application pedal pressure, said resilient means providing a geometrically progressively increasing resistance to pedal movement with increasing pedal pressure, and preloaded resilient means for resisting initial displacement of said first resilient means until a predetermined minimum pedal pressure is reached.

13. In an automotive vehicle equipped with a power steering system including hydraulic pump and open steering center valve elements and a hydraulic brake system including master cylinder and wheel cylinder elements; a power brake mechanism interposed in said steering system between said pump and steering valve elements and interposed in said brake system between said master cylinder and wheel cylinder elements, said mechanism including a pair of housing members with a flexible diaphragm interposed therebetween, opposed cylinder bores of different area in the respective housing elements, piston means in each of said bores, a valve bore and spool valve in the housing element having the larger cylinder bore, piston means axially opposing said spool valve in a bore in the opposing housing element, said last piston means establishing operating engagement with said spool valve and said respective large and small piston means establishing operating engagement through the medium of said flexible diaphragm element, ports in the housing element having the smaller cylinder bore for connection respectively to the master cylinder and wheel cylinders, ports in the opposing housing element for connection respectively with the steering pump and steering valve, said spool valve having a normal position for admitting substantially unrestricted flow between said pump and said steering valve, a brake engaging position for admitting substantially unrestricted flow from said pump to said larger piston means while blocking flow to said steering valve, and an intermediate brake modulating position continuing to block flow from said pump to said steering valve, a by-pass valve interposed between said pump and steering valve ports adapted to pass flow from said pump when the back pressure established by said spool valve reaches a predetermined maximum pressure, means for conducting master cylinder pressure to actuate said piston means operatively engaging said spool valve, means for conducting effective pressure for actuating the larger piston to react on the other end of said spool valve opposing said master cylinder pressure, means for admitting fluid directly from said master cylinder to said wheel cylinders in the absence of pump pressure, and means for blocking said direct flow during power brake applications.

14. Power brake mechanism comprising housing means, fluid pressure actuated fluid displacing means therein, inlet, outlet and exhaust ports and branch passage means in said housing means for conducting fluid under pressure from said inlet port to said outlet port, to actuate said fluid displacing means, and to said exhaust port, valve means in said passage means having a first position for directing flow from said inlet to said outlet port and from said fluid pressure actuated means to said exhaust port, a second position for directing fluid from said inlet port to said fluid pressure actuated means, and for substantially blocking flow from said inlet to said outlet port and to said fluid pressure actuated means, and from said fluid pressure actuated means to said exhaust port, and valve means responsive to establishment of a predetermined inlet pressure for opening flow from said inlet to said outlet port.

15. Power brake mechanism as set forth in claim 14 including a control pressure port, and means responsive to establishment of fluid pressure therein for actuating said valve means from said first to said second position.

16. Power brake mechanism as set forth in claim 14 including a control pressure port, and means responsive to establishment of fluid pressure therein for actuating said valve means from said first to said second position, said valve means being reactively responsive to establishment of a fluid pressure actuating pressure balancing said control pressure, and being moved thereby to said second position.

References Cited in the file of this patent

UNITED STATES PATENTS

| | | |
|---|---|---|
| 1,841,696 | Andres | Jan. 19, 1932 |
| 1,890,010 | Vickers | Dec. 6, 1932 |
| 2,328,637 | Freeman | Sept. 7, 1943 |
| 2,517,005 | MacDuff | Aug. 1, 1950 |
| 2,624,176 | Osborne | Jan. 6, 1953 |
| 2,667,184 | Hailer et al. | Jan. 26, 1954 |
| 2,680,350 | Sprague et al. | June 8, 1954 |
| 2,687,189 | Schnell | Aug. 24, 1954 |
| 2,764,262 | Stelzer | Sept. 25, 1956 |